United States Patent
Klabukov et al.

(10) Patent No.: US 10,067,342 B2
(45) Date of Patent: Sep. 4, 2018

(54) PORTABLE HEAD-UP DISPLAY FOR VEHICLE USE

(71) Applicant: OBSHCHESTVO S OGRANICHENNOJ OTVETSTVENNOSTYU "RIT INNOVACII", Izhevsk, Udmurtskaja Resp. (RU)

(72) Inventors: Ivan Anatolevich Klabukov, Izhevsk (RU); Aleksei Anatolevich Ostanin, Iyulskoye village (RU)

(73) Assignee: RIT INNOVATIONS, LLC, Izhevsk (RU)

( * ) Notice: Subject to any disclaimer, the term of this patent is extended or adjusted under 35 U.S.C. 154(b) by 153 days.

(21) Appl. No.: 15/105,140

(22) PCT Filed: Mar. 29, 2016

(86) PCT No.: PCT/RU2016/000178
§ 371 (c)(1),
(2) Date: Jun. 16, 2016

(87) PCT Pub. No.: WO2016/167687
PCT Pub. Date: Oct. 20, 2016

(65) Prior Publication Data
US 2017/0123203 A1    May 4, 2017

Related U.S. Application Data

(60) Provisional application No. 62/147,447, filed on Apr. 14, 2015.

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *B60R 1/00* (2013.01);
(Continued)

(58) Field of Classification Search
CPC ........ G02B 27/0101; G02B 2027/0141; G02B 2027/0154
See application file for complete search history.

(56) References Cited

U.S. PATENT DOCUMENTS 5,677,701 A * 10/1997 Okuyama .............. B60K 37/02
345/7
2009/0005961 A1* 1/2009 Grabowski .......... G01C 21/365
701/532

(Continued)

FOREIGN PATENT DOCUMENTS

WO    2015017693 A1    2/2015

*Primary Examiner* — Joseph P Martinez
(74) *Attorney, Agent, or Firm* — Georgiy L. Khayet

(57) ABSTRACT

A head-up display device comprises a cradle assembly and a stand assembly. The cradle assembly is configured to support a portable electronic device having a display. The stand assembly is configured to mount on a dashboard of a vehicle. The cradle assembly includes a platform and a combiner configured to at least partially reflect an output of the display of the portable electronic device. The combiner is pivotally connected to the platform using at least one combiner holder. The stand assembly includes a base and a pivot joint connected to the base and arranged substantially over the upper surface of the base. The stand assembly also has a coupler attached to the pivot joint and configured to releasably connect the cradle assembly with the stand assembly. The lower surface of the base may include a repositionable adhesive layer for coupling to the dashboard.

20 Claims, 10 Drawing Sheets

(51) Int. Cl.
    *B60R 1/00*           (2006.01)
    *B60K 37/02*              (2006.01)
    *H04W 88/06*              (2009.01)

(52) U.S. Cl.
    CPC ........ *B60K 37/02* (2013.01); *B60K 2350/106*
            (2013.01); *B60K 2350/2095* (2013.01); *B60K*
                *2350/925* (2013.01); *B60K 2350/946*
            (2013.01); *B60R 2300/205* (2013.01); *B60Y*
                *2400/92* (2013.01); *G02B 2027/0141*
        (2013.01); *G02B 2027/0154* (2013.01); *H04W*
                            *88/06* (2013.01)

(56)            References Cited

U.S. PATENT DOCUMENTS

2014/0240204 A1    8/2014  Chen
2015/0054760 A1*   2/2015  Amaru ............... G02B 27/0101
                                                        345/173

* cited by examiner

PORTABLE HEAD-UP DISPLAY FOR VEHICLE USE

CROSS-REFERENCE TO RELATED APPLICATIONS

This application is a U.S. National Stage Entry of PCT Patent Application No. PCT/RU2016/000178, entitled "Portable Head-Up Display for Vehicle Use", filed on Mar. 29, 2016, which claims benefit of U.S. Provisional Patent Application No. 62/147,447, filed on Apr. 14, 2015. The disclosures of the aforementioned applications are incorporated herein by reference in their entireties for all purposes.

TECHNICAL FIELD

This disclosure generally relates to head-up displays. More particularly, this disclosure relates to portable head-up displays for releasable mounting on an upward facing surface such as a surface of a dashboard or console of a vehicle.

DESCRIPTION OF RELATED ART

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Automotive navigation systems have become very popular for use by vehicle drivers. Generally, the navigation systems help find directions, display cartographic maps with select routes, and provide other related and useful information to the drivers. These systems typically include a satellite navigation device, such as Global Positioning System (GPS) receiver, to get their positional data, which is then correlated to a position on a displayable map.

The navigation systems have three general implementations. First, the navigation systems can be built in inside a vehicle and provide information using a vehicle display and vehicle speakers. Second, the navigation systems can be offered as a stand-alone navigation device commonly known as a GPS navigator. The GPS navigators include a display and can be mounted on a dashboard or windshield of a vehicle. Third, the navigation systems can be provided by a mobile application installed on a portable electronic device such as a mobile phone, smart phone, tablet computer, and the like. Typically, users mount the portable electronic devices to a dashboard or windshield of vehicle for ease of use.

Unfortunately, studies have demonstrated that the use of conventional navigation systems is not always safe and comfortable for the drivers. When in use, routine checking of the navigation system or speedometer distracts drivers. This causes driving blind for approximately 300 feet out of every mile. The move of glance from a road to the navigation system and back may take about two seconds, and the vehicle moves without the driver's supervision during that time. Moreover, many automobile accidents are caused by a driver's use of a mobile device or other electronic device while driving.

There have been a number of approaches taken to minimize drivers' distraction, including state regulations banning drivers from being distracted by the use of a mobile device, texting, and so forth. However, these approaches are not effective and thus need to be further advanced.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

According to one aspect of this disclosure, there is provided a head-up display device that comprises a cradle assembly and a stand assembly. The cradle assembly is configured to support a portable electronic device having a display. The stand assembly is configured to be mounted on a dashboard or a console of a vehicle. The cradle assembly comprises a platform and a combiner. The combiner is configured to at least partially reflect an output of the display of the portable electronic device. The combiner is pivotally or rotatably connected to the platform using at least one combiner holder. The stand assembly comprises a base and a pivot joint connected to the base and arranged substantially over the upper surface of the base. The stand assembly also has a coupler attached to the pivot joint and configured to releasably connect the cradle assembly with the stand assembly.

According to some embodiments, the cradle assembly includes two combiner holders and two torque inserts. The combiner holders can be pivotally connected to the platform substantially at one side of the platform. Each of the combiner holders includes an arm and a body, where the body includes a recess or a through hole for receiving a portion of the combiner. The arm of the combiner holder includes a through hole for receiving one of the torque inserts, and the platform includes two through holes or recesses for receiving the torque inserts. The cradle assembly can also include a friction pad arranged over the upper surface of the platform. The friction pad is designed to retain the portable electronic device in a non-slip fashion. In some embodiments, the platform includes a recess for receiving the friction pad and the friction pad can be adhered to the upper surface of the platform. The platform may further include a first ring magnet. The platform may include a circular recess located substantially in the middle of the platform for receiving the first ring magnet. The coupler of the stand assembly includes a second ring magnet arranged substantially co-axially with the first ring magnet for magnetic engagement with it. In some embodiments, the second ring magnet can be positioned within the pivot joint or attached to an upper surface of the pivot joint.

According to some embodiments, the pivot joint includes a hemispherical mount and a socket cup configured to receive at least a portion of the hemispherical mount. The hemispherical mount and the socket cup are co-axial to each other. The hemispherical mount includes a cavity that is open towards the upper surface of the base. The stand assembly comprises a head screw. The hemispherical mount further includes a first opening for receiving the head screw. The socket cup includes a second opening, which is co-axial with the first opening and is designed for receiving the head screw. The stand assembly further comprises a hemispherical nut holder having a third opening that is co-axial with the second opening and is for receiving the head screw. The hemispherical nut holder is disposed substantially within the cavity of the hemispherical mount. The hemispherical nut holder includes a nut for coupling with the head screw. The stand assembly further comprises a bottom cover for covering the cavity. The socket cup includes a puck plate, which includes a plurality of recesses or a plurality of protrusions. The base may include a recess for receiving the hemispherical mount. The stand assembly further comprises a repositionable adhesive layer configured to releasably and repositionably adhere to the dashboard or the console of the vehicle. In yet more embodiments, the combiner includes an aspherical lens having a substantially rectangular curved shape. The combiner includes at least one protrusion for inserting into the at least one combiner holder. The aspherical lens is also configured to scale the output up by a factor of at least 1.2. The aspherical lens has a scratch hardness value of at least 2H.

According to another aspect of this disclosure, there is provided a head-up display device that comprises a cradle assembly, which is configured to support a portable electronic device having a display, and a stand assembly, which is configured to be mounted on a dashboard or a console of a vehicle. The cradle assembly comprises a combiner configured to at least partially reflect an output of the display of the portable electronic device, a platform having a lower surface and an upper surface, and at least one combiner holder configured to hold the combiner. The at least one combiner holder is pivotally connected to the platform. The stand assembly comprises a plate having a lower surface and an upper surface and a coupler, such as a magnet coupler, attached to the plate and configured to releasably connect the cradle assembly with the stand assembly. The stand assembly may further include a repositionable adhesive layer attached to the lower surface of the plate. The repositionable adhesive layer is configured to releasably and repositionably adhere to the dashboard or the console of the vehicle.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Embodiments are illustrated by way of example and not limitation in the figures of the accompanying drawings, in which like references indicate similar elements and in which.

DETAILED DESCRIPTION OF EXAMPLE EMBODIMENTS

Figure 1:
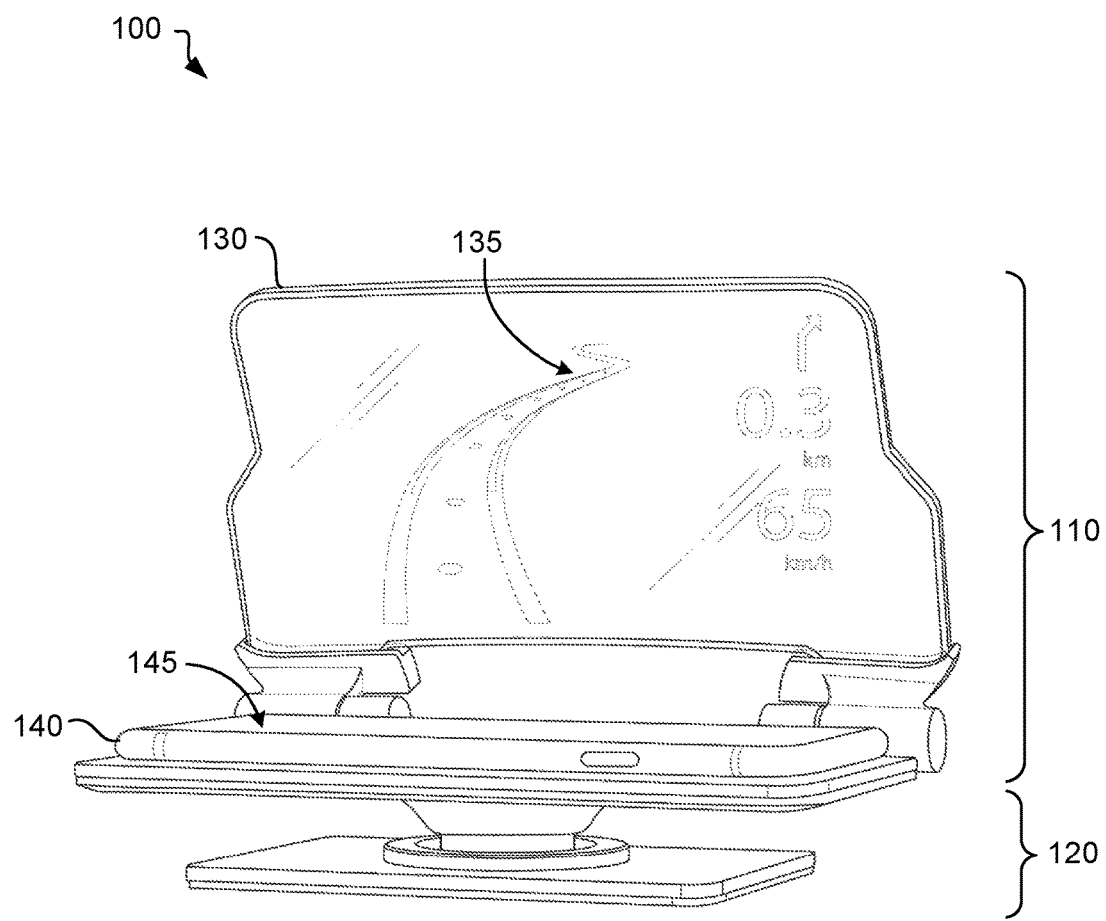
FIG. 1 shows a perspective view of a head-up display.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

The present teachings relate to a head-up display for use in a vehicle, such as an automobile. The head-up display can be mounted on a dashboard or console of a vehicle and in front of a driver. The head-up display includes a combiner, which is partially transparent and allows the driver to view both graphical information provided, for example, from a portable electronic device, such as a smart phone, and the usual driver's viewpoints such as the road ahead. Thus, the combiner allows presenting graphical information to the driver without requiring the driver to look away from the road. Moreover, in exemplary embodiments, the combiner is designed to project images from the portable electronic device out in front of the combiner at optical infinity such that the driver's eyes do not need to refocus between the combiner and the road. In other embodiments, the combiner can be configured to project images of the portable electronic device at various distances in front of the driver (for example, in a range of about one foot to about hundred feet in front of the combiner).

According to exemplary embodiments of this disclosure, the head-up display includes a cradle assembly for supporting a portable electronic device and a stand assembly for mounting on a dashboard or console of a vehicle. The cradle assembly can be releasably connected to the stand assembly using one or more couplers such as magnetic couplers. Moreover, the stand assembly can be configured to hinge, incline, or rotate the cradle assembly to allow the driver to adjust the position of the head-up display for greater convenience. The combiner is hinged or otherwise rotatably connected to the cradle assembly. Accordingly, the driver can adjust the position of the combiner and select a convenient position enabling the driver to read the images reflected by the combiner and see the road ahead. These adjusting capabilities enable the driver to use the head-up display in a wide range of vehicles.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to." Additionally, all ranges provided herein include the upper and lower values of the range unless explicitly noted. For example, the term "about" shall mean a reasonable deviation of a value accompanying this term. If it is not specified otherwise, the term "about" may refer to a variation of 10% from an indicated value. In the case of a range of values, the term "about" may refer to a 10% variation from both the lower and upper limits of the range.

It should be also understood that the terms "first," "second," "third," and so forth can be used herein to describe various elements. These terms are used to distinguish one element from another, but not to imply a required sequence of elements. For example, a first element can be termed a second element, and, similarly, a second element can be termed a first element, without departing from the scope of present teachings.

Moreover, it shall be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," and so forth). Spatially relative terms, such as "beneath," "below," "lower," "above," "upper" and the like may be used to describe an element or feature's relationship to another element(s) and/or feature(s) as, for example, illustrated in the drawings. It shall be appreciated the spatially relative terms are intended to encompass different orientations of the head-up display or its elements in use in addition to the orientation depicted in the figures. For example, if the head-up display or any of its components in the drawings is turned over, elements described as "below" and/or "beneath" other elements or features would then be oriented "above" the other elements or features. The head-up display or its components may be otherwise oriented (e.g., rotated 90 degrees or at other orientations) and the spatially relative descriptors used herein interpreted accordingly.

Furthermore, for purposes of this patent document, the term "head-up display" may also be referred to "heads-up display" or simply HUD. The term "driver" shall mean an operator of a vehicle or a user of head-up display according to the present teachings. In some embodiments, the head-up display can be used by passengers of a vehicle. The term "vehicle" shall mean any device, system, or apparatus for transporting, carrying, or conveying individuals or objects, including automobiles, buses, trucks, vans, sport utility vehicles, trailers, trains, railroad cars, boats, ships, aircrafts, airplanes, helicopters, farm equipment, electric cars, motorcycles, motorbikes, bikes, bicycles, and so forth. The term "portable electronic device" shall mean any portable electronic device with a display or image-projecting device, including a mobile device, cellular phone, mobile phone, smart phone, tablet computer, laptop computer, personal digital assistant, music player, multimedia player, portable computing device, GPS navigator, navigation system, and so forth.

Exemplary embodiments are described with reference to the drawings. The drawings are schematic illustrations of idealized example embodiments. As such, variations from the shapes of the illustrations as a result, for example, of manufacturing techniques or tolerances, are to be expected. Thus, example embodiments discussed herein should not be construed as limited to the particular shapes of regions illustrated herein but are to include deviations in shapes that result, for example, from manufacturing.

FIG. 1 shows a perspective view of a head-up display 100, according to one example embodiment. The head-up display 100 includes a cradle assembly 110 and a stand assembly 120. The stand assembly 120 can be mounted on a dashboard or console of a vehicle. Depending on particular implementation, the stand assembly 120 can be permanently or temporary (releasably) connected to the dashboard. For example, as will be explained below, a lower surface of the stand assembly 120 can be provided with a repositionable adhesive layer for releasable adherence to the dashboard. The repositionable adhesive layer can also enable releasably adhering the stand assembly 120 on curved, bumpy, uneven, or rough surfaces. In other embodiments, the stand assembly 120 can be connected to the dashboard using a friction mount or a suction cup. In yet more embodiments, the stand assembly 120 can be connected to the dashboard using metalware, clips, clamps, locks, and the like.

The cradle assembly 110 includes a combiner 130 rotatably or hingedly connected to a platform, which receives a portable electronic device 140 such as a smart phone. The combiner 130 reflects images and graphical information provided from a display 145 of portable electronic device 140 such that a driver can see reflected images 135 and a road ahead on the combiner 130. The graphical information provided by the portable electronic device 140 can be of any kind and nature. For example, the portable electronic device 140 can display navigational data, a route, a map, directions, distances, current vehicle speed, maximum speed allowed in current vehicle location, information of incoming calls, text messages, still and motion pictures, and the like. The displayable information can be dynamic and change based on a location of the vehicle. For instance, while driving, the portable electronic device 140 can routinely determine current location of the vehicle and update displayable information based on the current location determined. In certain embodiments, the portable electronic device 140 shall include and run a dedicated mobile application designed to display flipped graphical information, which becomes unflipped after reflection from the combiner 130.

Figure 2:
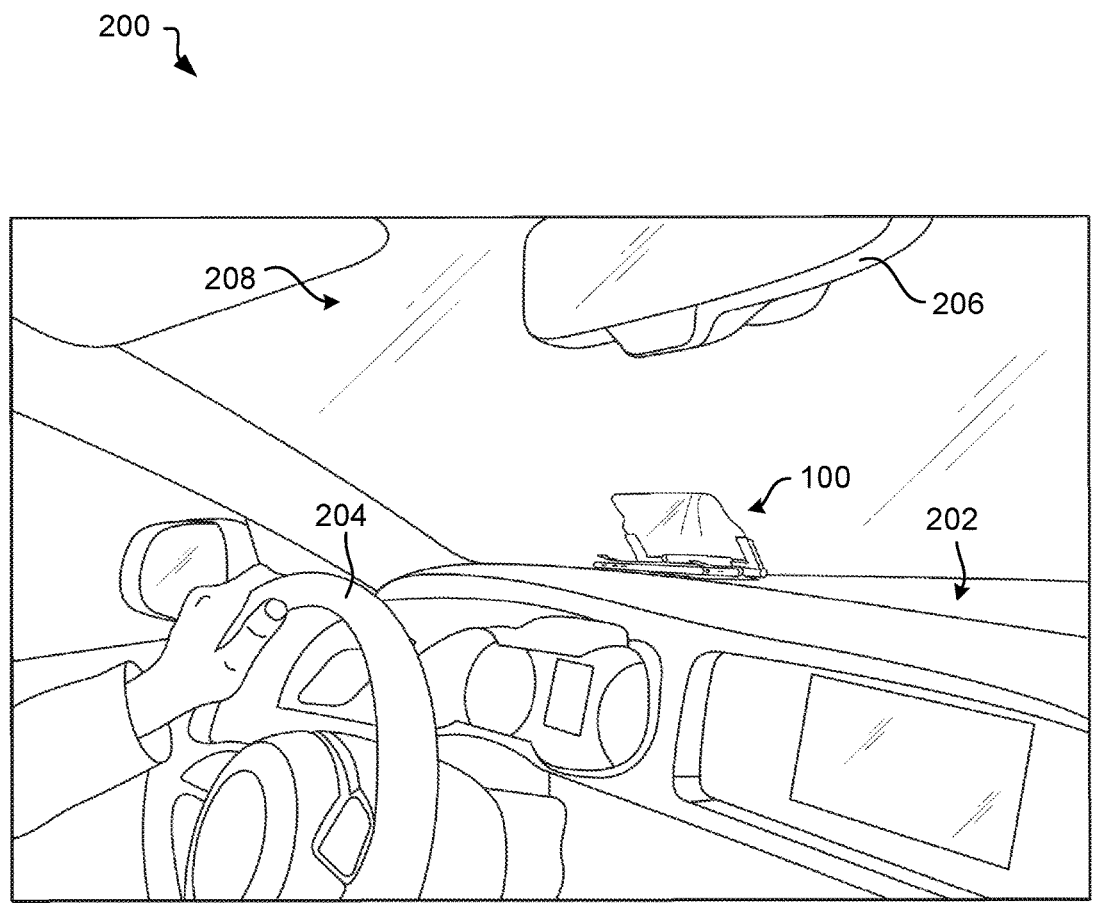
FIG. 2 shows a portion of a vehicle interior equipped with a head-up display.

FIG. 2 shows a portion of vehicle interior 200 as viewed from a front passenger seat of an automobile. Generally, the embodiment of FIG. 2 illustrates a dashboard 202, a steering wheel 204 hold by a driver's hand, a rear view mirror 206, and a windshield 208. The dashboard 202 has an upward facing surface, which can be planar, substantially planar, or curved depending on a vehicle. FIG. 2 further shows a head-up display 100, which is mounted, placed, coupled, or connected to the dashboard 202 substantially in front of the driver. Thus, in operation, the driver can view both the road and information reflected by the head-up display 100 without looking away from the road. Accordingly, the use of the head-up display 100 in the vehicle allows reducing a number of distractions for the driver and makes the overall use of the navigation system safer. The transparency of the combiner 130 can be selected to allow the driver comfortably see the road and read the reflected information from the portable electronic device without changing an eye focus.

Figure 3:
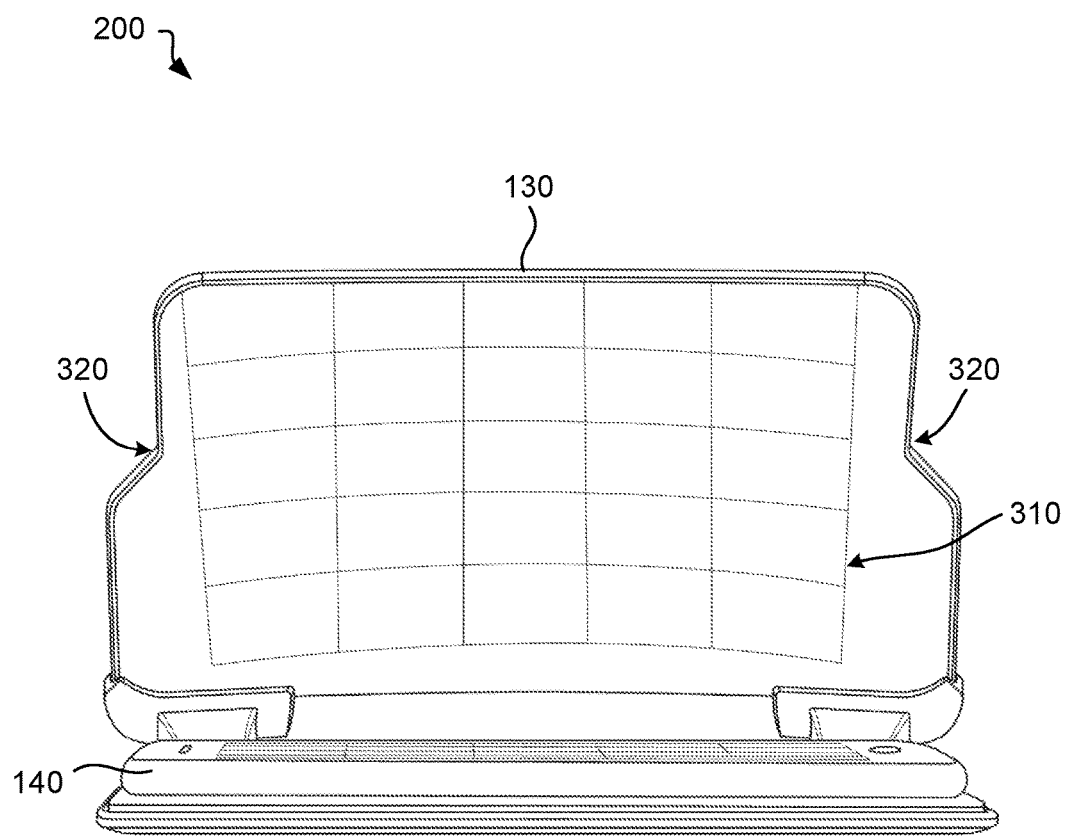
FIG. 3 shows a front view of a cradle assembly of a head-up display with a portable electronic device, according to one example embodiment.

FIG. 3 shows a front view of a cradle assembly 200, which receives a portable electronic device 140, according to one example embodiment. The cradle assembly includes a combiner 130 that is configured to at least partially reflect an output of a display 310 of portable electronic device 140. The transparency of the combiner 130 can vary depending on an application or particular needs. For example, a transparency value of the combiner 130 can be in a range from about 10% to 100%. Similarly, a reflection value of the combiner 130 can vary depending on application and be in a range from about from about 10% to 100%. In some embodiments, it can be preferable to balance the transparency value with the reflection value for more optimal use during day and night times.

The geometry of the combiner 130 can also vary and range from a flat design to a curved design. In some embodiments, the combiner 130 can have the shape of a convex lens, aspherical lens, or concave mirror. Moreover, in certain embodiments, the combiner 130 can be collimated (i.e., when the focal point (and the reflected image accordingly) are perceived to be in optical infinity). Geometric parameters (e.g., curve) of combiner 130 can be selected such that the focal point is at a distance from about one foot away from the combiner 130 to about 100 feet away from the combiner 130 or even at optical infinity.

FIG. 3 further shows a reflected image 310 produced by the portable electronic device 140 in the form of a layout grid. In this embodiment, a curved, aspherical lens geometry of the combiner 130 slightly distorts the layout grid from the portable electronic device 140 such that the reflected image 310 shows a distorted layout grid. The degree of distortion can be predetermined and selected to meet certain application requirements; however, in most applications, the image distortion can be not significant or substantially absent. In some embodiments, the combiner 130 can be configured to magnify the output of the portable electronic device 140. In other words, the reflected image can be a scaled up (magnified) image of the output of the portable electronic device 140. The magnification degree of the combiner 130 can vary and be in a range from about 1.1 to about 2.0. In the example shown in FIG. 3, the output is magnified by about 20% (i.e., the magnification factor is about 1.2).

According to example embodiments of this disclosure, the combiner 130 can be provided with one or more coatings, films, or layers on one or more sides of the combiner 130. In one example embodiment, the combiner 130 can be covered with at least one protective film, such as a transparent protective liner. In an additional example embodiment, the combiner 130 can be covered with at least one scratch resistant film to protect the combiner 130 from scratches, cracks, dirt, dust, grease, and the like. The scratch hardness value of the scratch resistant film can be at least 1H. In yet another example embodiment, the combiner 130 can be covered with at least one anti-reflective coating, which eliminates the effect of double reflection from both a front surface of the combiner 130 and a back surface of the of the combiner 130. In yet another example embodiment, the combiner 130 can be covered with at least one layer configured to change its opacity. For example, a photochromic layer can be provided for increasing the opacity in daylight and increasing the reflection value of the combiner 130. In another embodiment, the combiner 130 may be provided with an active thin-film transistor liquid-crystal display (TFT LCD) for dynamically changing the opacity (transparency) of the combiner 130 based upon light conditions or predetermined rules.

The combiner 130 can be made of a polymer material (e.g., polycarbonate or polymethylmethacrylate), glass (e.g., mineral glass, resin glass, organic glass), sapphire, and the like. Dimensions of combiner 130 can be selected to fit the entire graphical output produced by a display of portable electronic device 140. For example, linear dimensions of the combiner are about 145 millimeters over about 95 millimeters. The thickness of the combiner 130 is about 3 millimeters or less. The scratch hardness of the combiner 130 can be in range from about 1H to about 10H. For example, in one example, the scratch hardness of the combiner 130 is about 2H.

The shape of the combiner 130 can also vary. In the example shown in FIG. 3, the combiner 130 is an aspherical lens having a substantially rectangular curved shape. There can be provided two recesses 320 in upper corners (opposite to the side connected to the platform of the cradle assembly 110). The recesses 320 can form a right angle, obtuse angle, or acute angle. The recesses 320 can also form a tapered shape of the combiner 130.

Figure 4:
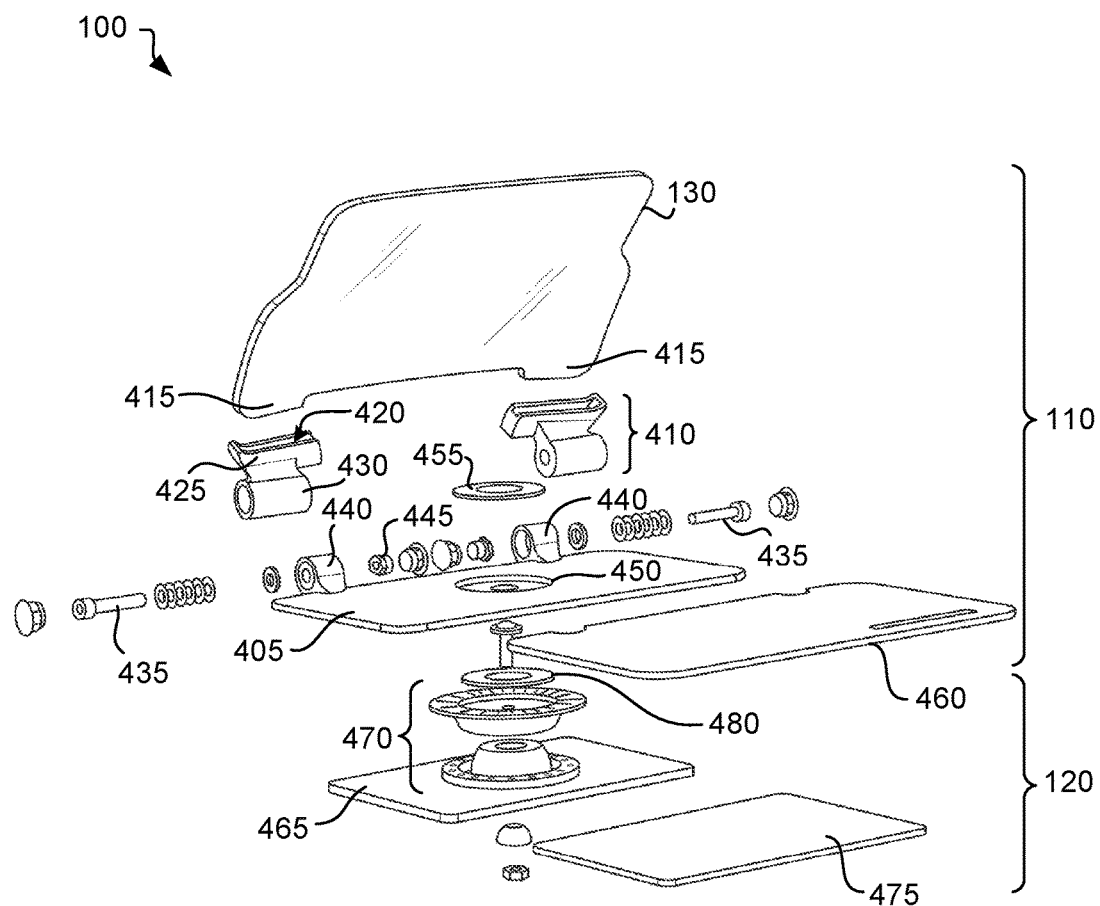
FIG. 4 shows an exploded view of a head-up display, according to one example embodiment.

FIG. 4 shows an exploded view of a head-up display 100, according to one example embodiment. Specifically, the embodiment of FIG. 4 includes a cradle assembly 110 and a stand assembly 120. The cradle assembly 110 includes a platform 405 having a substantially planar and rectangular form and a combiner 130. The platform 405 can made of a polymer material. The combiner 130 is pivotally connected to the platform 405 using at least one combiner holder, such as two combiner holders 410 shown in FIG. 4. The combiner 130 includes at least one protrusion on its side facing the combiner holder 410. For example, as shown in FIG. 4, the combiner 130 includes two protrusions 415. Each of the protrusions 415 is designed for inserting into a recess 420 of a body 425 of the combiner holder 410. Each of the combiner holders 410 includes an arm 430 coupled to the body 425. The arm 430 includes a though hole for receiving a torque insert 435 (or screw, pin, or stud). The platform 405 includes two arms 440, each of which includes a though hole for receiving the same torque inserts 435 (or screw, pin, or stud), which are inserted into the arm 430 of the combiner holder 410. Thus, the items 410, 435, and 440 form a hinge connection of the combiner 130 to the platform 405. As shown in FIG. 4, the hinge connection may be further provided with one or more ring plates and stopper plugs.

The torque inserts 435 (or screws, pins, or studs) provide substantially constant stress (frictional forces) during the combiner 130 closing or opening. The stress is sufficient to fix the combiner 130 in any position the driver or user chooses. Moreover, the stress can also be sufficient to resist vibrations of vehicle. The torque inserts 435 are to be inserted into the through holes of the arms of combiner holders 410 and platform 405, and then tightened with nuts 445. In other embodiments, the torque inserts 435 can be glued or fixed to the arms 440 or platform 405.

The platform 405 includes a recess 450, such as a circular recess, located substantially in the middle of the upper surface of the platform 405 for receiving a first magnet 455, such as a first ring magnet. Alternatively, there can be provided a metal element (e.g., a ring metal element) or a ferromagnetic element (e.g., a ring ferromagnetic element) instead of the first ring magnet 455. The first magnet 455 forms a coupler or a part of a coupler for connecting the cradle assembly 110 to the stand assembly 120.

The cradle assembly 110 may also include a friction (anti-slip) pad 460 for attaching to an upper surface of the platform 105. Generally, the friction pad 460 is configured to retain the portable electronic device 140 in a non-adhesive and non-slip fashion. The friction pad 460 can retain the portable electronic device 140 in substantially the same position even if significant vehicle vibrations occur. The friction pad 460 can be made from silicon, polymer gel, vinyl, or "jelly glue" for releasable holding or retaining of the portable electronic device 140. In alternate embodiments, the cradle assembly 110 may include other connectors or holders for holding the portable electronic devices.

For example, there can be used suction cups, clips, clamps, compressor bars, locks, and the like.

Still referring to FIG. 4, the stand assembly 120 includes a base 465 and a pivot joint 470 described below with reference to FIG. 6A. The base 465 is made from a polymer material and has a substantially rectangular shape. The base 465 is configured to be placed, coupled, or connected to a dashboard 202 of a vehicle. The base 465 can be provided with one or more connecting means for securing the base 465 on the dashboard 202. In one example, there can be provided a repositionable adhesive layer 475 at a lower surface of the base 465. The repositionable adhesive layer 475 can be configured to releasably and repositionably adhere to the dashboard 202 or console of the vehicle.

The pivot joint 470 is arranged substantially above the upper surface of the base 465 and below the lower surface of the platform 405. The pivot joint 470 allows a user to incline, rotate, or adjust a position of the cradle assembly 110 with respect to the stand assembly 120. The pivot joint 470 can be also provided with a second magnet 480 such as a second ring magnet. Alternatively, there can be provided a metal element (e.g., a ring metal element) or a ferromagnetic element (e.g., a ring ferromagnetic element) instead of the second ring magnet 480. The first ring magnet 455 and second ring magnet 480 form a coupler configured to releasably connect the cradle assembly 110 with the stand assembly 120 using magnetic forces. In alternate embodiments, the coupler can include metalware, clips, clamps, locks, or any other connectors configured to releasably connect the cradle assembly 110 with the stand assembly 120.

Figure 5A:
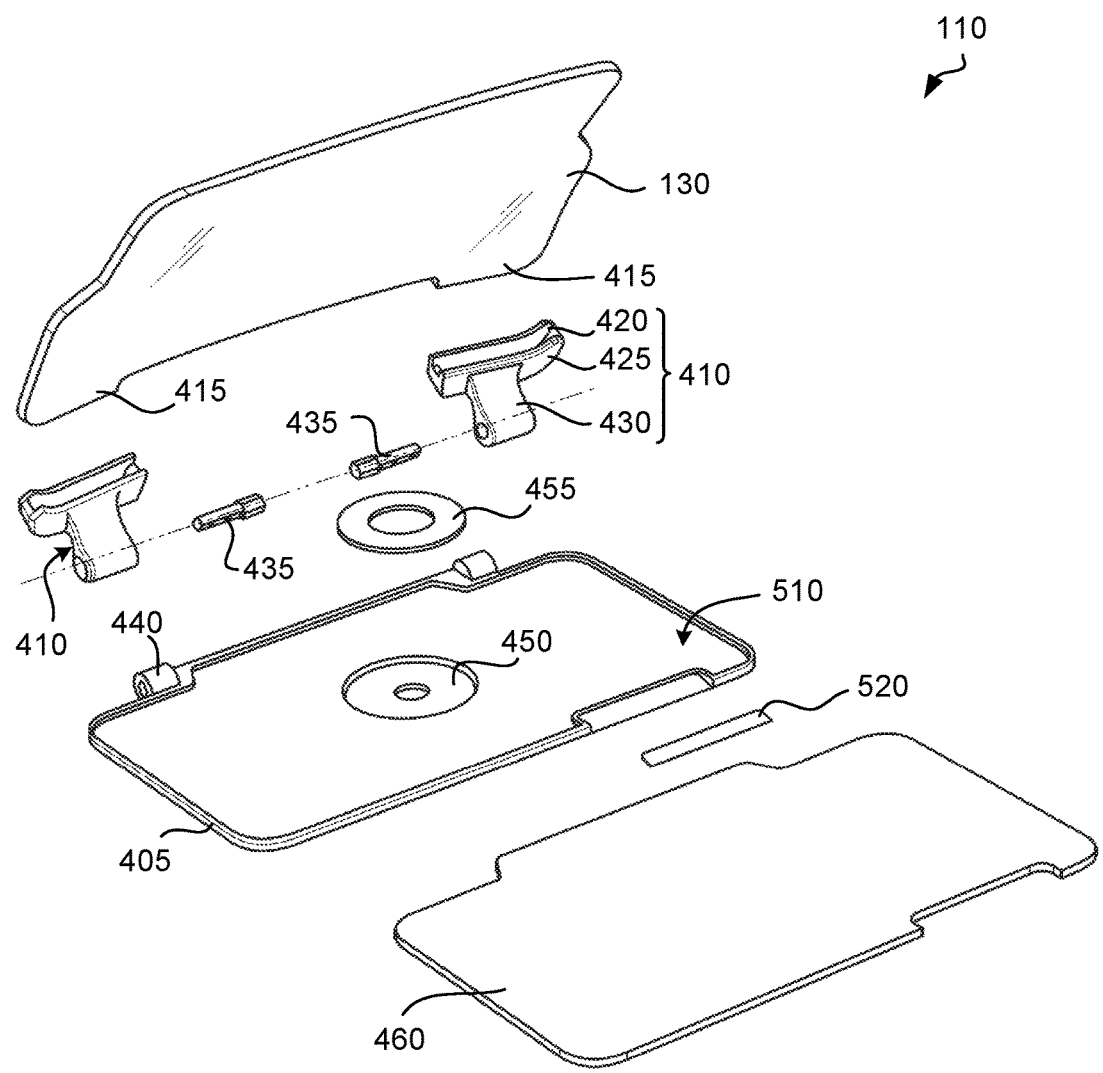
FIG. 5A shows an exploded view of a cradle assembly of a head-up display, according to another example embodiment.
Figure 5B:
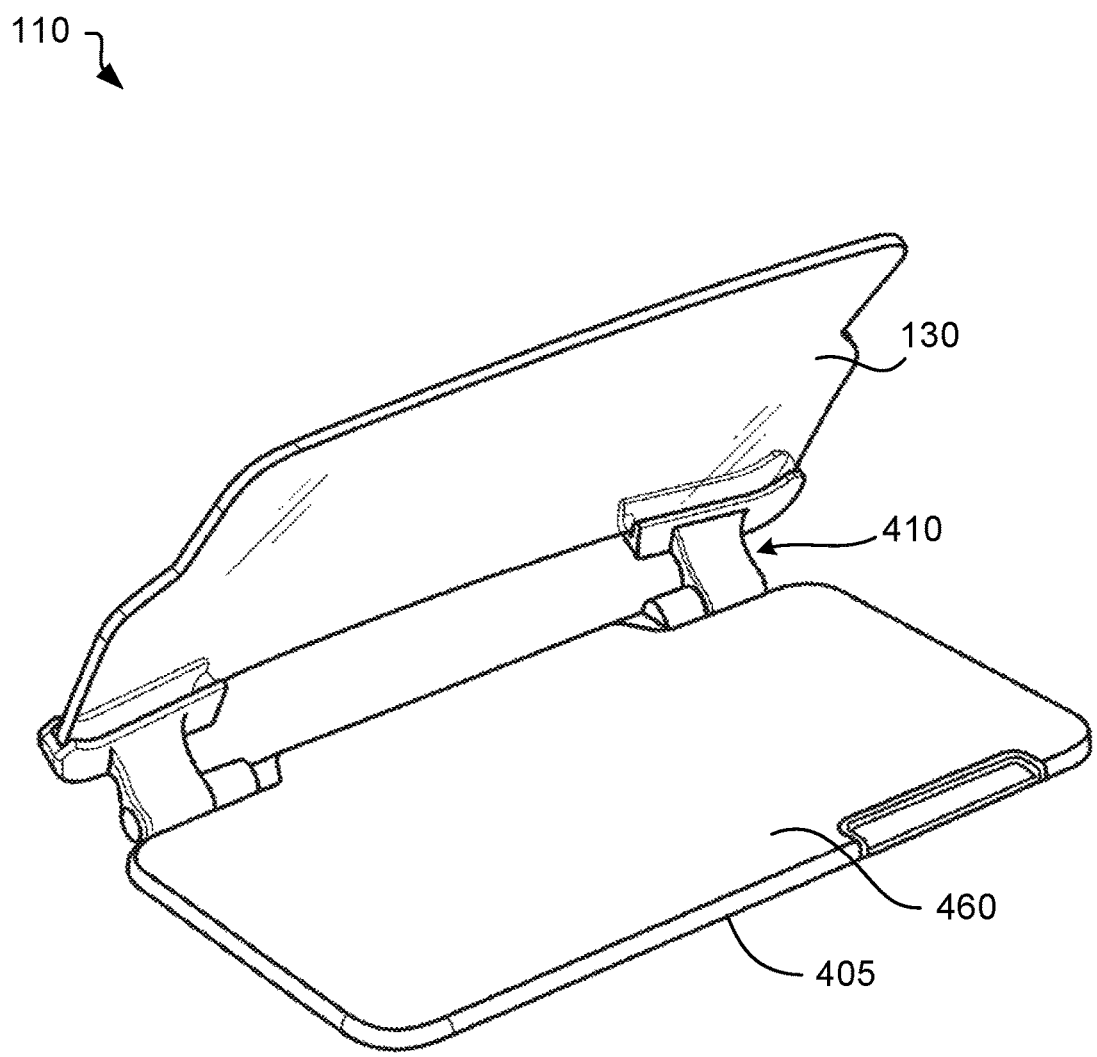
FIG. 5B shows an assembled view of the cradle assembly depicted in FIG. 5A.

FIG. 5A shows an exploded view of a cradle assembly 110, according to another example embodiment. FIG. 5B shows an assembled view of the cradle assembly 110 depicted in FIG. 5A. Similar to above, the cradle assembly 110 includes a platform 405 pivotally or rotatably connected to a combiner 130. The platform 405 includes a first recess 510 for receiving a friction pad 460. In some embodiments, the friction pad 460 can be secured, glued or adhered to the upper surface of platform 405. The platform 405 includes a second recess 450 inside the first recess 510 for receiving a first magnet 455 such as a first ring magnet. The platform 405 is a coupler of the cradle assembly 110 to the stand assembly 120. When assembled, the first magnet 455 is arranged under a lower surface of the friction pad 460. In some embodiments, the friction pad 460 or platform 405 may include a logo sticker 520 or an informational plate.

The platform 405 further includes arms 440 (for example, two arms 440) for receiving at least a portion of torque inserts 435. The cradle assembly 110 further includes a combiner 130 connected to at least one combiner holder 410. In the shown example, there are two combiner holders 410. Each of combiner holders 410 has a body 425 with a recess 420 or opening for receiving and securing (e.g., by gluing) protrusions 415 of the combiner 130. Each of combiner holders 410 also has an arm 430 with a trough hole or recess for receiving a torque insert 435.

Figure 6A:
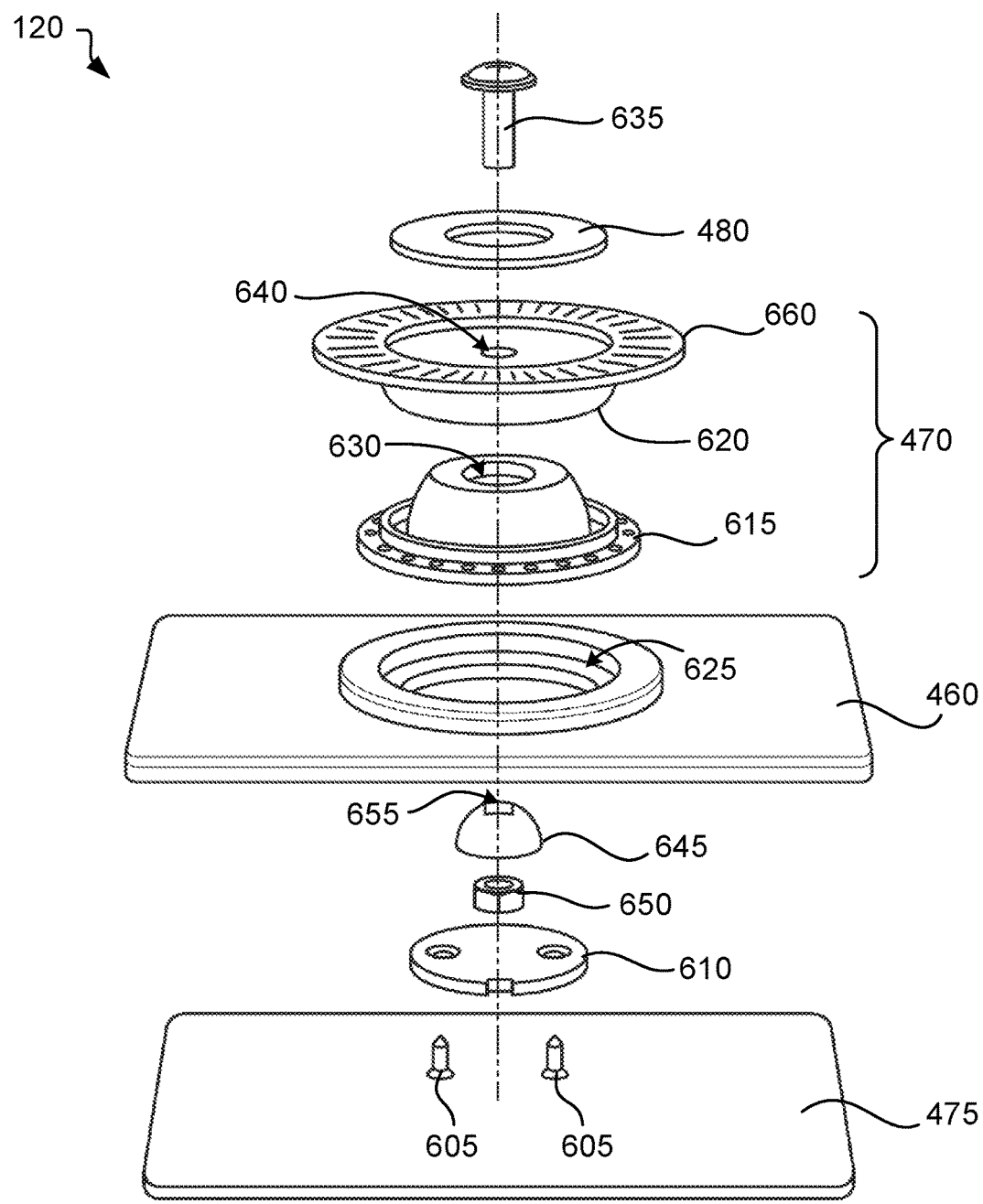
FIG. 6A shows an exploded view of a stand assembly of a head-up display, according to one example embodiment.
Figure 6B:
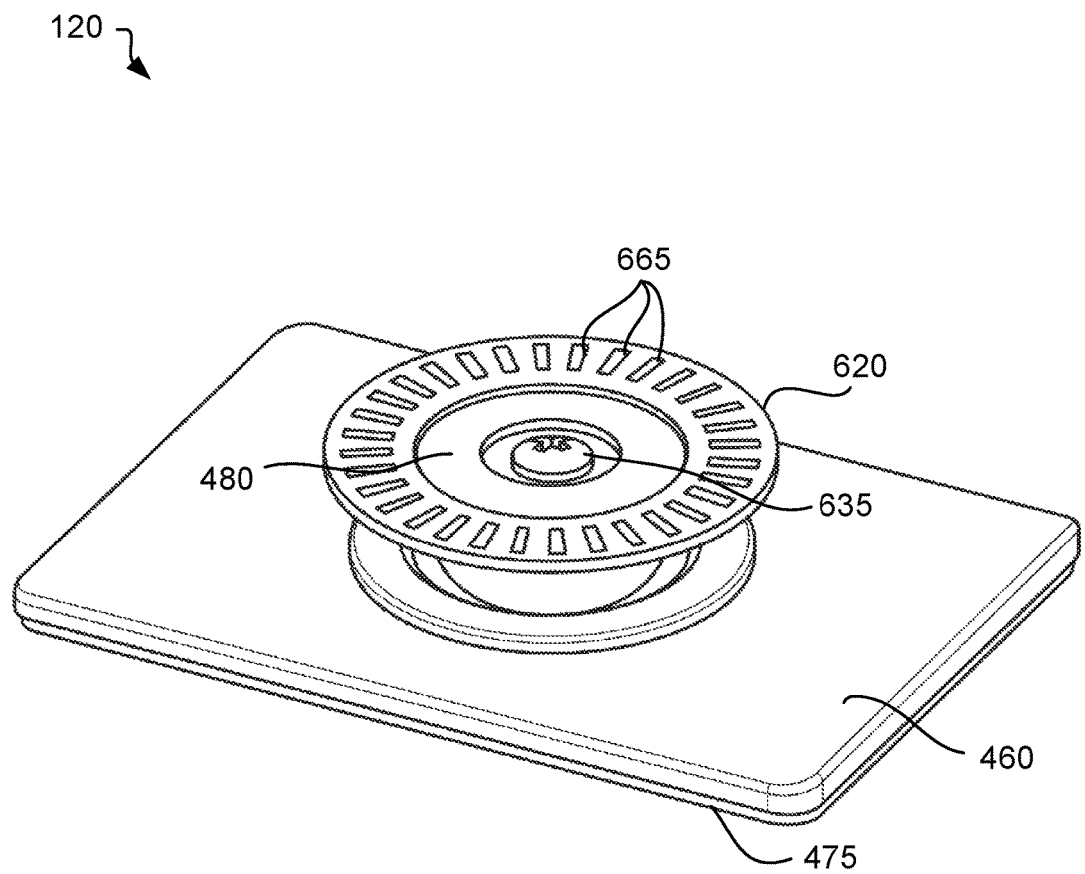
FIG. 6B shows an assembled view of the stand assembly depicted in FIG. 6A.

FIG. 6A shows an exploded view of a stand assembly 120, according to yet another example embodiment. FIG. 6B shows an assembled view of the stand assembly 120 of FIG. 6A. The stand assembly 120 of FIG. 6A includes a base 460 and a pivot joint 470 connected to the base 460. A lower surface of the base 460 can be provided with a repositionable adhesive layer 475 for releasable and repositionable adherence to a dashboard of a vehicle. The repositionable adhesive layer 475 may include one or more self-tapping screws 605 substantially in the middle of the repositionable adhesive layer 475. There can be provided a bottom cover plate 610 coupled to the repositionable adhesive layer 475 using the self-tapping screws 605.

The pivot joint 470 includes a hemispherical mount 615 and a socket cup 620. The socket cup 620 is configured to receive at least a part of the hemispherical mount 615. The hemispherical mount 615 and the socket cup 620 are co-axially arranged. The hemispherical mount 615 has substantially a hollow hemispherical shape with a cavity that is open towards the upper surface of the base 460. After assembling, the cavity of hemispherical mount 615 becomes at least partially closed by the cover plate 610. In some embodiments, the base 460 may include a recess 625 for receiving the hemispherical mount 615. The recess 625 is substantially in the middle of the base 460. The hemispherical mount 615 can be fixed or connected to the base using a glue, screw, clips, clamps, and so forth.

The hemispherical mount 615 includes a first opening 630 for receiving a head screw 635 (or a stud, pin, screw). Similarly, the socket cup 620 includes a second opening 640 for receiving the head screw 635. The stand assembly 120 further includes a hemispherical nut holder 645 and a nut 650. The hemispherical nut holder 645 includes a third opening 655 for receiving the head screw 635. The nut 650 is configured to be connected with the head screw 635. The hemispherical nut holder 645 and nut 650 are located substantially within the cavity of the hemispherical mount 615. The first opening 630, second opening 640, and third opening 650 are substantially coaxial. The cavity of the hemispherical mount 615 can be covered with the bottom cover 610.

A lower portion of the socket cup 620 includes a substantially hemispherical recess for receiving an upper portion of the hemispherical mount 615 in a sliding manner. The upper portion of the socket cup 620 includes a puck plate 660 for connecting to the lower surface of the platform 405. The puck plate 660 may include a plurality of recesses 665 or a plurality of protrusions, which may improve the connection of the stand assembly 120 with the cradle assembly 110 (e.g., increasing friction forces). The puck plate 660 may include a recess, such as a circular recess or ring recess, for receiving a second magnet 480 such as a second ring magnet. The second magnet 480 is a coupler of the stand assembly 120 to the cradle assembly 110.

Figure 7A:
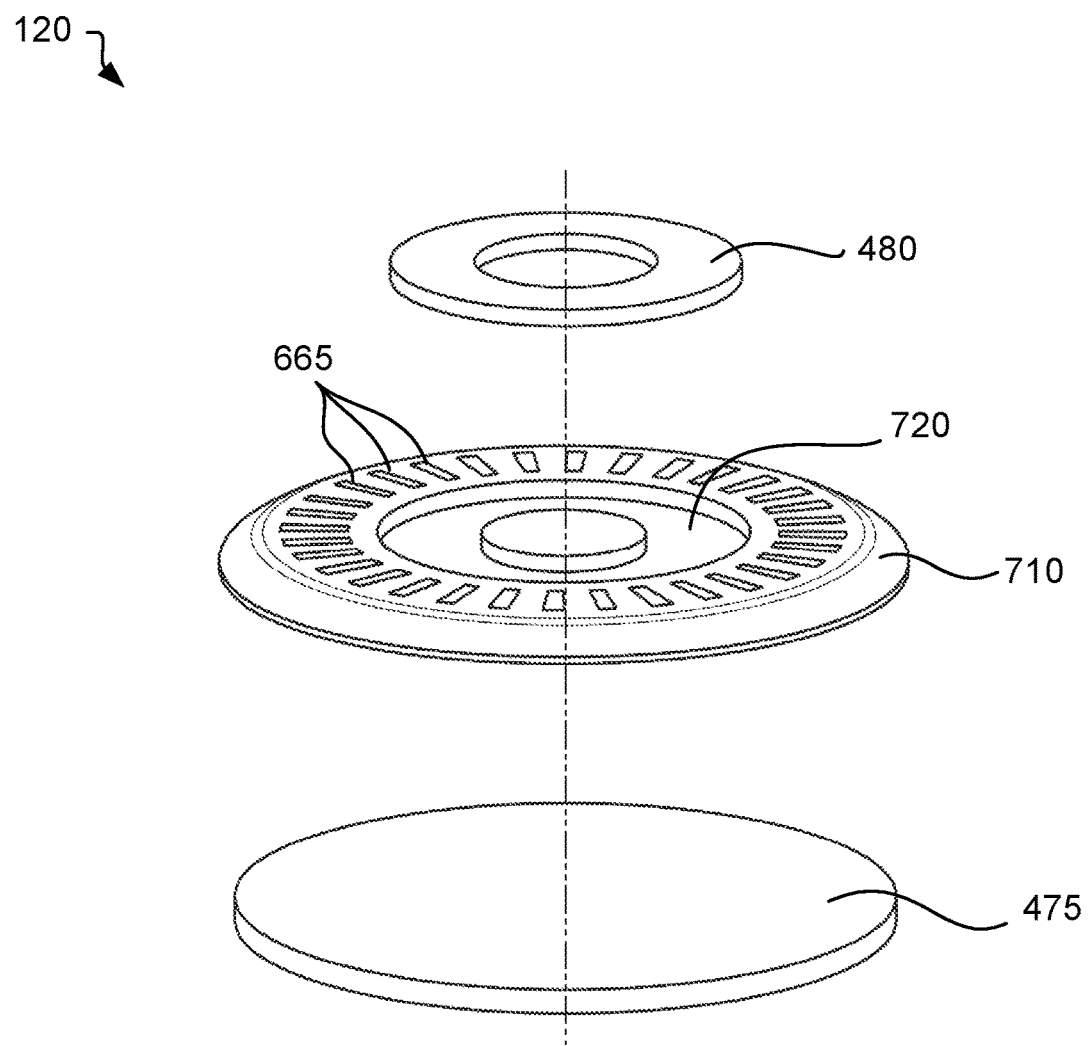
FIG. 7A shows an exploded view of a stand assembly of a head-up display, according to an alternative example embodiment.
Figure 7B:
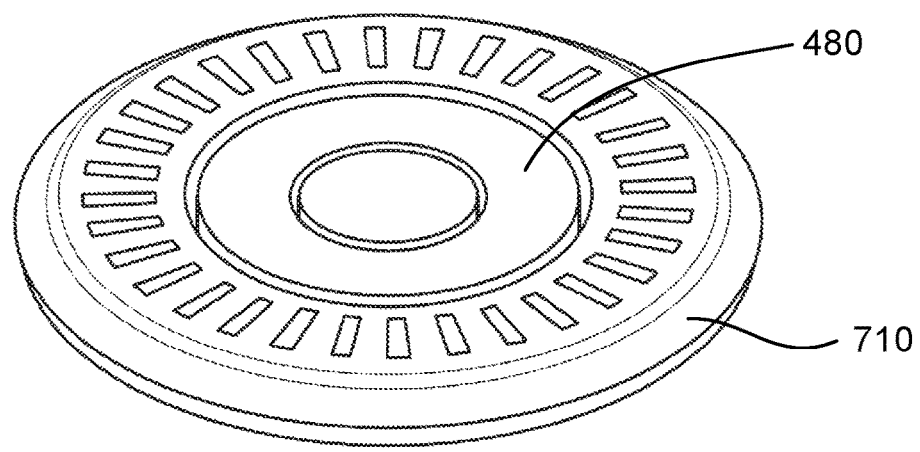
FIG. 7B shows an assembled view of the stand assembly depicted in FIG. 7A.

FIG. 7A shows an exploded view of a stand assembly 120, according to an alternative embodiment. FIG. 7B shows an assembled view of the stand assembly 120 of FIG. 7A. In this embodiment, the stand assembly 120 includes a plate 710 having a shape of a curved puck and a repositionable adhesive layer 475 attached to a lower surface of the plate 710. The repositionable adhesive layer 475 can be configured to releasably and repositionably adhere to a dashboard 202 or console of a vehicle, thereby releasably connecting the head-up assembly 100 to the dashboard 202 or console of the vehicle.

The plate 710 includes a recess 720 such as a circular recess (or ring recess) coaxial with the plate 710. The stand assembly 120 may further include a coupler for releasable coupling the stand assembly 120 to the cradle assembly 110. In one example embodiment, the coupler includes a second magnet 480. In operation, the first magnet 455 of the cradle assembly 110 engages into magnetic contact with the second magnet 480 of the stand assembly 120, thereby releasably coupling the cradle assembly 110 with the stand assembly 120. Each of the first magnet 455 and second magnet 480 may have a ring shape, circular shape, puck shape, or the like. In some embodiments, one of the first magnet 455 and second magnet 480 can include a metallic plate or ferromagnetic plate. In yet more embodiments, the first magnet 455 and second magnet 480 can be substituted with other coupling means such as metalware, clips, clamps, locks, or any other connectors configured to releasably connect the cradle assembly 110 with the stand assembly 120.

Still referring to FIGS. 7A and 7B, the upper surface of plate 710 may include a plurality of protrusions 665 (or recesses) arranged in a ring shape with a substantially regular period for enhancing characteristics of coupling the cradle assembly 110 to the stand assembly 120. In some embodiments, the lower surface of the platform 405 of cradle assembly 110 may also include a plurality of recesses (or protrusions) arranged in a manner to mirror the shape and design of protrusions 665 (recesses) in the upper surface of plate 710. In this example, upon connection of the cradle assembly 110 to the stand assembly 120, the recesses in the lower surface of the platform 405 can receive the protrusions 665 formed in the upper surface of plate 710. Alternatively, upon connection of the cradle assembly 110 to the stand assembly 120, the recesses in the upper surface of the plate 710 can receive the protrusions formed in the lower surface of platform 405.

Thus, various embodiments of portable head-up display for vehicle use have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A head-up display device, comprising:
    a cradle assembly configured to support a portable electronic device having a display, the cradle assembly comprising:
        a combiner configured to at least partially reflect an output of the display of the portable electronic device;
        a platform having a lower surface and an upper surface; and
        at least one combiner holder configured to hold the combiner, the at least one combiner holder is pivotally connected to the platform;
    a stand assembly configured to be mounted on a dashboard or a console of a vehicle, the stand comprising:
        a base having a lower surface and an upper surface;
        a pivot joint connected to the base and arranged substantially over the upper surface of the base and under the lower surface of the platform, wherein the pivot joint enables a user to rotate and incline the cradle assembly relative to the stand assembly; and
        a coupler attached to the pivot joint and configured to releasably connect the cradle assembly with the stand assembly.

2. The device of claim 1, wherein the cradle assembly includes two combiner holders and two torque inserts, wherein the combiner holders are pivotally connected to the platform substantially at one side of the platform.

3. The device of claim 2, wherein each of the combiner holders includes an arm and a body, wherein the body includes a recess for receiving a portion of the combiner.

4. The device of claim 3, wherein the arm includes a through hole for receiving one of the torque inserts, and the platform includes two holes for receiving the torque inserts.

5. The device of claim 1, wherein the cradle assembly further comprising a friction pad arranged over the upper surface of the platform, the friction pad is configured to retain the portable electronic device in a non-slip fashion.

6. The device of claim 1, wherein the platform includes a recess for receiving the friction pad, wherein the friction pad is adhered to the upper surface of the platform.

7. The device of claim 1, wherein the platform further includes a first ring magnet.

8. The device of claim 7, wherein the platform includes a circular recess located substantially in the middle of the platform for receiving the first ring magnet.

9. The device of claim 7, wherein the coupler of the stand assembly includes a second ring magnet arranged substantially co-axially with the first ring magnet.

10. The device of claim 9, wherein the second ring magnet is within the pivot joint.

11. The device of claim 1, wherein the pivot joint includes a hemispherical mount and a socket cup configured to receive at least a portion of the hemispherical mount, wherein the hemispherical mount and the socket cup are co-axial to each other, and wherein the hemispherical mount includes a cavity that is open towards the upper surface of the base.

12. The device of claim 11, wherein the stand assembly further comprising a head screw, wherein the hemispherical mount includes a first opening for receiving the head screw, the socket cup includes a second opening, which is co-axial with the first opening and is for receiving the head screw.

13. The device of claim 12, wherein the stand assembly further comprising a hemispherical nut holder having a third opening that is co-axial with the second opening and is for receiving the head screw, wherein the hemispherical nut holder is disposed substantially within the cavity of the hemispherical mount.

14. The device of claim 13, wherein the hemispherical nut holder includes a nut for coupling with the head screw.

15. The device of claim 11, wherein the stand assembly further comprising a bottom cover for covering the cavity.

16. The device of claim 11, wherein the socket cup includes a puck plate, wherein the puck plate includes a plurality of recesses or a plurality of protrusions.

17. The device of claim 11, wherein the base includes a recess for receiving the hemispherical mount.

18. The device of claim 1, wherein the stand assembly further comprising a repositionable adhesive layer configured to releasably and repositionably adhere to the dashboard or the console of the vehicle.

19. The device of claim 1, wherein the combiner includes an aspherical lens having a substantially rectangular curved shape, wherein the combiner includes at least one protrusion for inserting into the at least one combiner holder, wherein the aspherical lens is configured to scale the output up by a factor of at least 1.2, and wherein the aspherical lens has a scratch hardness value of at least 2H.

20. A head-up display device, comprising:
    a cradle assembly configured to support a portable electronic device having a display, the cradle assembly comprising:
        a combiner configured to at least partially reflect an output of the display of the portable electronic device;
        a platform having a lower surface and an upper surface; and
        at least one combiner holder configured to hold the combiner, the at least one combiner holder is pivotally connected to the platform;

a stand assembly configured to be mounted on a dashboard or a console of a vehicle, the stand comprising:
- a plate having a lower surface and an upper surface;
- a coupler attached to the plate and configured to releasably connect the cradle assembly with the stand assembly;
- a pivot joint connected to the plate and arranged substantially over the upper surface of the plate and under the lower surface of the platform, wherein the pivot joint enables a user to rotate and incline the cradle assembly relative to the stand assembly; and
- repositionable adhesive layer attached to the lower surface of the plate, the repositionable adhesive layer is configured to releasably and repositionably adhere to the dashboard or the console of the vehicle.

* * * * *